W. SEIDEL.
RESILIENT WHEEL.
APPLICATION FILED OCT. 28, 1914.
1,168,035.
Patented Jan. 11, 1916.
2 SHEETS—SHEET 2.
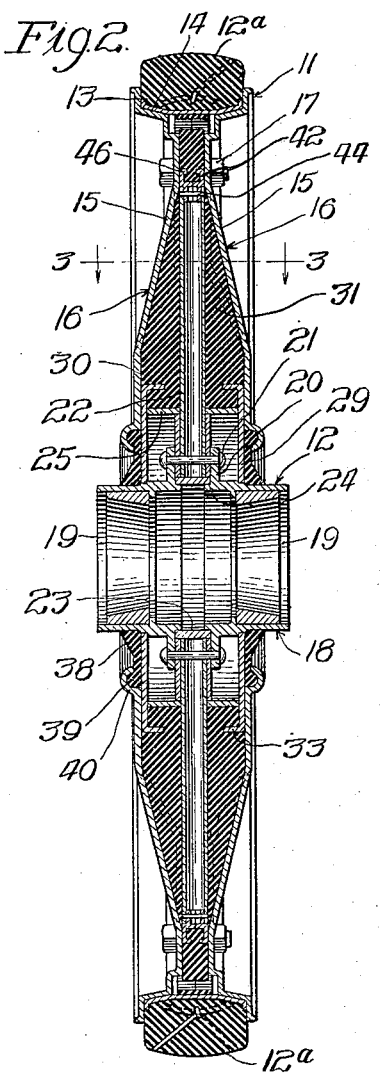
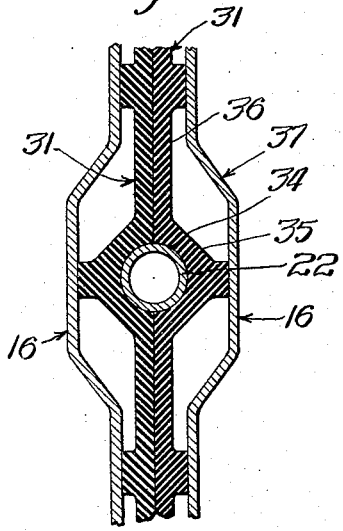
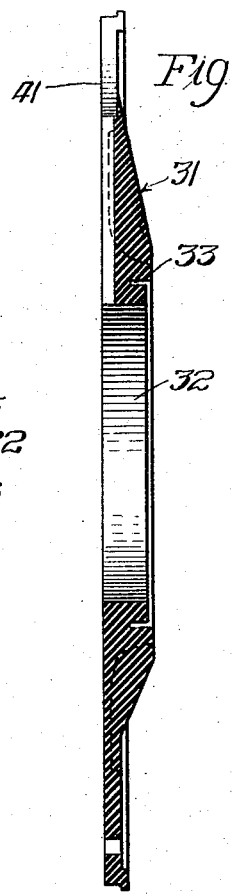
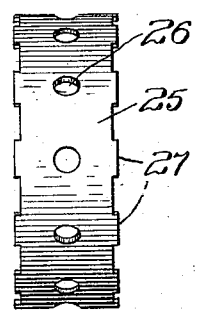
Witnesses:
Inventor
William Seidel
by Blauning & Blauning
Attys

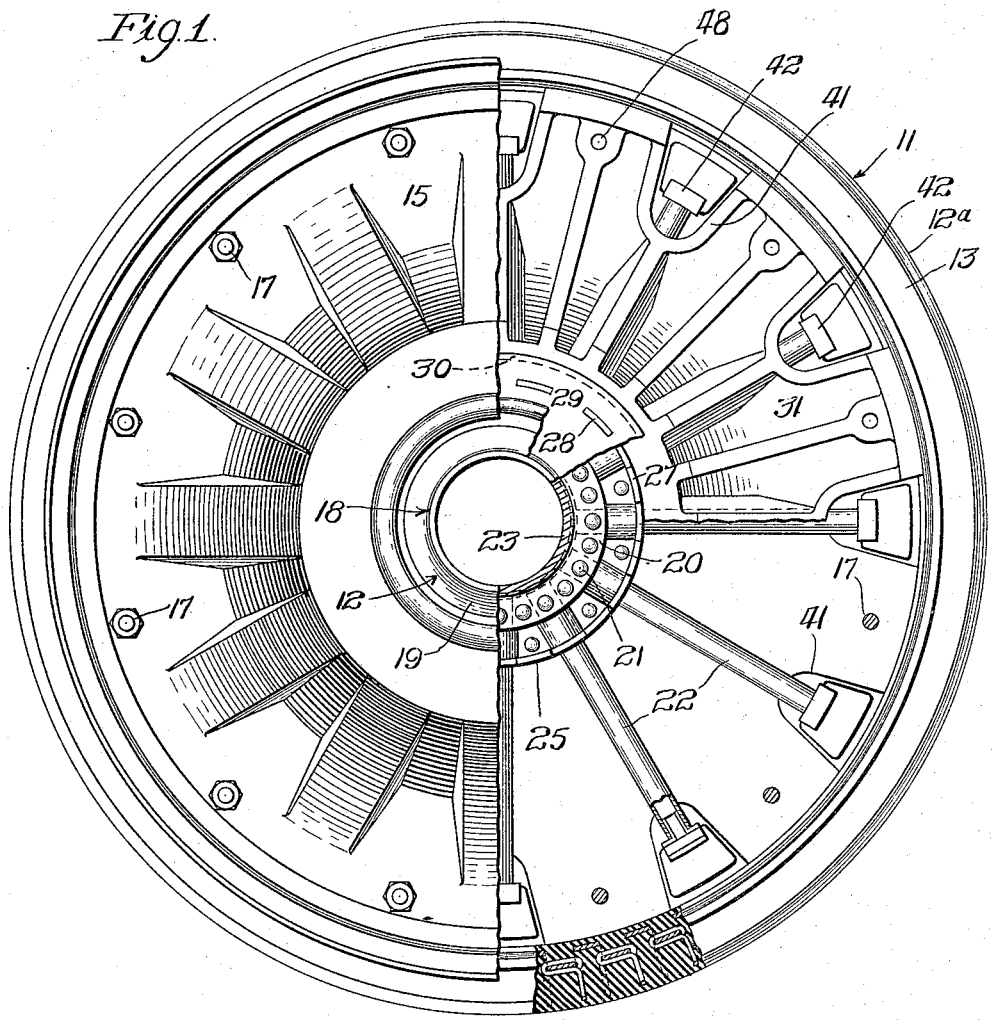

UNITED STATES PATENT OFFICE.

WILLIAM SEIDEL, OF CHICAGO, ILLINOIS.

RESILIENT WHEEL.

1,168,035.

Specification of Letters Patent.

Patented Jan. 11, 1916.

Application filed October 28, 1914. Serial No. 869,132.

*To all whom it may concern:*

Be it known that I, WILLIAM SEIDEL, a citizen of the United States, residing at Chicago, in the county of Cook and State of Illinois, have invented certain new and useful Improvements in Resilient Wheels, of which the following is a specification.

The present invention relates to a wheel more particularly adapted for automobiles or other vehicles and which although of the resilient type, is of non-pneumatic character.

The objects of the invention are to form a wheel with an outer section which is movable diametrically with respect to the axle of the wheel and an inner section which is fixed with respect to such diametrical movement, and to provide resilient or cushioning means in the form of rubber or other suitable composition, and to so arrange the parts that, when the movable section of the wheel is actuated, it will compress the resilient substance upon one side of the axial center of the wheel and stretch or distend said substance on the opposite side of such center thus bringing into action all of the resilient substances for the purpose of absorbing shock.

A further object of the invention is to arrange a driving engagement between the movable and fixed sections of the wheel to give tractive power to the wheel.

A further object of the invention is to provide parts which are cheap and simple of construction and which when assembled will give durability and stability to the wheel as a whole.

The invention further consists in the features of construction and combinations of parts hereinafter described and claimed.

In the drawings: Figure 1 is a face view of the wheel of the present invention with parts broken away; Fig. 2 is a diametrical section through the wheel; Fig. 3 is a section on line 3—3 of Fig. 2; Fig. 4 is a section of one of the resilient disks of the shock absorbing device; Fig. 5 is a detail showing the ring or band through which the lower ends of the spokes extend; Fig. 6 is a face view of one of the portions of the block carried at the upper end of the spoke; Fig. 7 is a section of such portion; Fig. 8 is a face view of one of the resilient members held by the blocks shown in Figs. 6 and 7; and Fig. 9 is a section of the parts shown in Fig. 8.

In the art to which the present invention relates, namely, non-pneumatic resilient wheels, difficulty has been found in constructing said wheels with cushioning members of rubber, etc., because of the fact that the cushioning influence will only be exerted by that portion of the members extending around one half of the wheel, that part of the members above the axial center serving no function when the movable section of the wheel is raised, and the principal object of the present invention is to obtain a resilient or cushioning action on both sides of the axial center of the wheel, thus bringing into action all of the cushioning material provided.

The wheel as a whole consists of an outer section 11 and an inner section 12, the outer section may be termed the movable section because it is movable diametrically with respect to the axle of the wheel. The inner section 12 may be termed the fixed section because it is held against such diametrical movement. The section 11 embodies a tread $12^a$ which may be of any suitable form and construction. This tread $12^a$ is carried by a rim 13 which rim is formed with an upper channel 14 in which the tread rests, and the rim is formed by the channeled edges of two plates 15. Each of the plates are similar in formation and are therefore interchangeable. These plates are formed with an inward bend for the major portion thereof as at 16 (see Figs. 1 and 2), and since they surround the rubber disks of the shock absorbing device they constitute a casing or closure to prevent grit, etc., from working into the interior of the wheel. These closure plates or members are held in place by means of bolts or other suitable fastening means 17.

The fixed section 12 consists of a hub portion 18 composed of two parts 19 similar in formation. Each of these parts is formed with upwardly extending flanges 20 and a bolt or other fastening member 21 extends through these flanges for the purpose of holding in place the spokes 22. The flanges 20 are of an undulating formation as will be seen from Fig. 1, so that pockets are provided therein for the reception of these spokes and the spokes in the construction shown are of the metallic tubular formation. A ring 23 is positioned to lie at the base of the spokes and this ring is held in place by lips 24 inwardly extending from the members 19 (see Fig. 2). An outer ring 25 is provided formed with openings 26 through which the spokes extend, and the edges of this ring are notched to provide lugs 27, (see Fig. 5) and these lugs are arranged to extend through openings 28 formed in a circular plate 29 which rests against the hub of the wheel (see Fig. 2), there being two of these plates in the construction shown, which are similar in formation and oppositely disposed from one another and the periphery of the plates are bent inward to form a flange 30 (see Fig. 2).

The main cushioning members of the wheel consist of two rubber disks or members designated by the general numeral 31, each of which is similar in form and size and are therefore interchangeable. The disks are cut away at their center to form a circular opening 32 which is of a size to accommodate the ring 25. The disks 31 have a groove 33 formed therein which lies just beyond the opening 32, (see Fig. 4) and into these grooves extend the flanges 30 of the plates 29. Thus there is a positive connection between the circular plates 29 and the rubber disks or members 31, and the plates 29 are anchored to the hub of the wheel by the lugs 27 extending through the slots or openings 28. The lower ends of the rubber disks or cushioning members are also anchored to said hub, this constituting a means for anchoring the resilient members to the inner section of the wheel.

The rubber disks 31 are each provided with a plurality of semi-circular recesses 34 extending radially from the outer to the inner edge thereof, (see Figs. 1 and 3), and when the two disks are joined together as in Fig. 3, a circular opening is provided through which the spokes 22 extend, there of course being one opening for each spoke. The disks 31 are thickened as at 35, where the spokes pass through, and are thinned as at 36. The closure plates 16 are spread outwardly as at 37 so that at periodical intervals there is considerable clearance between the outer face of the rubber disks 31 and the inner face of the closure plates. This permits of the compression of the disks as is necessary in order to have them fulfil their function as shock absorbing agencies.

Rubber rings 38 are provided, there being two in the construction shown, which are placed around the hub sections 19 (see Fig. 2) and these rings 38 may be said to constitute auxiliary cushioning devices. A bead 39 is provided at the outer end of each of these rings which is engaged by a bead 40 on the inner end of the plate 16, so that these rings are attached to both the outer and inner sections of the wheel. The members or disks 31 are formed with notches 41 occurring at periodical intervals around the periphery thereof (see Fig. 1), and into the opening produced by these notches, extend the upper end of the spokes 22. Each spoke at its upper end carries a clip 42 formed of two sections 43 of similar formation, (see Figs. 8 and 9), which sections are secured to the spokes by fastening members 44 of any suitable style. These clips 42 carry resilient blocks 45 shown in detail in Figs. 6 and 7. The lips 46 of the clips engaged with notches 47 in the blocks 45 and these blocks where obstructions are met are compressed and serve as auxiliary cushion devices so that a cushioning is effected by means of the disks 31, rings 38 and blocks 45. The disks 31 are provided with holes 48 through which extend the bolts 17 that secure the plates 16 in place, so that there is a positive connection between the upper portion of the disks and the outer section of the wheel, and this in conjunction with the flanges 30 form means for securing the disks to both the inner and outer sections of the wheel.

The operation of the device will be understood from the foregoing but briefly is as follows: When an obstruction is encountered, that portion of the movable section below the axle of the wheel will move inward and toward the axle compressing that portion of the disks 31 and rings 38 which lies below the axial center of the wheel together with the blocks 45. That portion of the movable member above the axial center of the wheel will move outward and away from said axle, and owing to the connection between the rings 38 and the plates 16 a pulling action will be exerted on that portion of said rings lying above the axial center of the wheel, and by their stretching shock absorption is produced. The member 31 being anchored to the fixed portion of the wheel at their lower ends by means of the flanges 30 of the plates 29, and to the movable portion of the wheel at their upper ends by the bolts 17 will be stretched for that part lying above the axial center of the wheel by the outward movement of the upper portion of the movable section, and by this stretching action shock is absorbed so that all portions of the disks 31 and rings 38 are brought into operation as shock absorbing agencies and a maximum use is made of the shock absorbing material for shock absorbing purposes. By means of the spoke extending through the disks 31 there is an efficient and effective tractive engagement formed between the outer section and the inner sections of the wheel so that power is readily communicated from the axle to the tread of the wheel.

I claim:

1. In a resilient wheel the combination of an outer section movable diametrically with respect to the axle of the wheel, an inner section held against such diametrical movement, cushioning substance interposed between the inner and outer wheel sections, a positive connection between said cushioning substance and the outer wheel section, a positive connection between the cushioning substance and the inner wheel section, and auxiliary cushioning substance around the hub of the wheel and engaging at its upper end with the lower end of the inner section, substantially as described.

2. In a resilient wheel the combination of an outer section movable diametrically with respect to the axle of the wheel, an inner section held against such diametrical movement, cushioning substance concentric with the axle of the wheel, a positive connection between the upper end of said cushioning substance and the outer wheel section, a positive connection between the lower end of said cushioning substance and the inner wheel section, and auxiliary cushioning substance around the axle of the wheel and connected at its upper end to the outer section and having its lower end resting against the inner section, substantially as described.

3. In a resilient wheel the combination of an outer section movable diametrically with respect to the axle of the wheel, an inner section held against such diametrical movement, spokes extending from the inner section, companion disk-like members of resilient material formed at intervals with radially extending grooves, said sections when placed together having the grooves therein alined to provide bores through which said spokes extend, a positive connection between the resilient members and the outer section of the wheel, and a positive connection between the resilient member and the inner section of the wheel, substantially as described.

4. In a resilient wheel the combination of an outer section movable diametrically with respect to the axle of the wheel, an inner section held against such diametrical movement, spokes extending from the inner section, companion disk-like members of resilient material formed at intervals with radially extending grooves, said disks when placed together having the grooves therein alined to provide bores through which said spokes extend, a positive connection between the resilient member and the outer section of the wheel, a positive connection between the resilient member and the inner section of the wheel, and a ring of auxiliary cushioning substance interposed about the axle of the wheel, substantially as described.

5. In a resilient wheel the combination of an outer section movable diametrically with respect to the axle of the wheel, an inner section held against such diametrical movement, cushioning material interposed between the outer and inner wheel sections and extending concentric with the axle of the wheel, said material being notched at intervals around its periphery to form recesses and said material being formed with bores extending into said notched portions, spokes on the inner wheel section extending through said bores and into said recesses, and cushioning material affixed to the outer ends of said spokes, substantially as described.

6. In a resilient wheel the combination of an outer section movable diametrically with respect to the axle of the wheel, an inner section held against such diametrical movement, cushioning material extending concentric with the axle of the wheel, said material being notched at intervals around its periphery to form recesses and said material being formed with bores extending into said recesses, spokes on the inner wheel section extending through said bores and into said recesses, cushioning material affixed to the outer ends of said spokes, and said notched cushioning material being secured at its outer end to the outer section of the wheel and at its inner end to the inner section of the wheel, substantially as described.

7. In a resilient wheel the combination of an outer section movable diametrically with respect to the axle of the wheel, an inner section held against such diametrical movement, cushioning material consisting of companion disks arranged to extend concentric with the axle of the wheel, metallic plates arranged to be secured to the outside of said disks and said plates being formed with outward bends occurring at intervals whereby at intervals a space is provided between the said disks and the walls of said plates to permit of compression of the said disks, and said bends serving as ribs to reinforce said plates, substantially as described.

8. In a resilient wheel the combination of an outer section movable diametrically with respect to the axle of the wheel, an inner section held against such diametrical movement, cushioning material consisting of companion disks arranged to extend concentric with the axle of the wheel, metallic plates arranged to be secured to the outside of said disks and said plates being formed with outward bends occuring at intervals whereby at intervals a space is provided between the said disks and the walls of said plates to permit of compression of the said disks, a connection between the outer end of said disks and the outer section of the wheel and a connection between the inner end of said disks and the inner section of said wheel, substantially as described.

9. In a resilient wheel the combination of an outer section movable diametrically with respect to the axle of the wheel, an inner section held against such diametrical movement, disk-like members of cushioning material arranged to extend concentric with the axle of the wheel, said disk-like members being formed with grooves on their inner faces, said grooves when the disks are placed together forming radially extending bores, spokes secured to the inner section and extending into said bores, metallic plates arranged to be secured to the outside of said disks and said plates being formed with outward bends occurring at intervals whereby a space is provided between the said disks and the walls of said plates to permit of compression of the said disks, and said disks being notched around their periphery to provide recesses, said spokes extending into said recesses and resilient material affixed to the outer ends of said spokes, substantially as described.

10. In a resilient wheel the combination of an outer section movable diametrically with respect to the axle of the wheel, an inner section held against such diametrical movement, resilient material interposed between said inner and outer wheel sections, a member fixed to the inner section, a protuberance and slot connection between said inner section and the cusioning material and a connection between said cushioning material and the outer section adjacent the outer portion of said outer section, substantially as described.

11. In a resilient wheel the combination of an outer section movable diametrically with respect to the axle of the wheel, an inner section held against such diametrical movement, cushioning material arranged concentric to the axle of the wheel, said cushioning material having a groove formed on a side face thereof and adjacent the inner portion thereof and a member extending from the inner section and engaging with said groove and a connection between the outer portion of the resilient material and the outer section of the wheel, substantially as described.

12. In a resilient wheel the combination of an outer section movable diametrically with respect to the axle of the wheel, an inner section held against such diametric movement, cushioning material arranged concentric with the axle of the wheel, metallic plates inclosing said cushioning material, means for retaining said plates in position, said retaining means serving to connect said cushioning material with the outer wheel section and a connection between said cushioning material and the inner wheel section, substantially as described.

WILLIAM SEIDEL.

Witnesses:
WM. P. BOND,
EPHRAIM BANNING.

Copies of this patent may be obtained for five cents each, by addressing the "Commissioner of Patents, Washington, D. C."